(12) United States Patent
Chen et al.

(10) Patent No.: US 11,281,803 B2
(45) Date of Patent: Mar. 22, 2022

(54) OBFUSCATING CONTENT BASED ON REQUESTING USER ROLES

(71) Applicant: SAP SE, Walldorf (DE)

(72) Inventors: Wei Chen, Shanghai (CN); Wei Zhao, Shanghai (CN)

(73) Assignee: SAP SE, Walldorf (DE)

( * ) Notice: Subject to any disclaimer, the term of this patent is extended or adjusted under 35 U.S.C. 154(b) by 341 days.

(21) Appl. No.: 16/711,191

(22) Filed: Dec. 11, 2019

(65) Prior Publication Data

US 2021/0182429 A1 Jun. 17, 2021

(51) Int. Cl.
G06F 21/62 (2013.01)
H04L 12/58 (2006.01)
H04L 51/52 (2022.01)
H04L 51/18 (2022.01)

(52) U.S. Cl.
CPC .......... *G06F 21/6263* (2013.01); *H04L 51/18* (2013.01); *H04L 51/32* (2013.01)

(58) Field of Classification Search
CPC ...... G06F 21/6263; G06F 10/10; G06F 21/62; H04L 51/18; H04L 51/32; H04L 12/58
See application file for complete search history.

(56) References Cited

U.S. PATENT DOCUMENTS

| | | | | |
|---|---|---|---|---|
| 7,512,985 | B1* | 3/2009 | Grabarnik | G06F 21/6263 707/999.009 |
| 10,205,742 | B2* | 2/2019 | Hansen | H04L 63/123 |
| 10,225,289 | B1* | 3/2019 | Tucker, IV | H04W 4/023 |
| 10,984,068 | B2* | 4/2021 | Holloway | H04L 63/0861 |
| 2013/0179985 | A1* | 7/2013 | Strassman | G06F 21/60 726/26 |
| 2014/0013451 | A1* | 1/2014 | Kulka | G06F 21/14 726/29 |
| 2014/0189499 | A1* | 7/2014 | Gigliotti | G06F 40/143 715/236 |
| 2016/0088327 | A1* | 3/2016 | Cronk | H04N 21/47202 725/30 |
| 2020/0151356 | A1* | 5/2020 | Rohloff | G06F 21/6227 |
| 2020/0159963 | A1* | 5/2020 | Giuseppe | G06T 3/0093 |
| 2020/0395107 | A1* | 12/2020 | Griffin | G06F 16/1824 |
| 2020/0403956 | A1* | 12/2020 | Adamski | G06F 16/9536 |

* cited by examiner

*Primary Examiner* — Sargon N Nano
(74) *Attorney, Agent, or Firm* — Schwegman Lundberg & Woessner, P.A.

(57) ABSTRACT

Various examples are directed to systems and methods for serving content to a user. A content server may receive content from a submitting user. The content server may extract a first name entity from the content. The content server may generate configuration data for the content, where the configuration data comprises an association between the first name entity and at least one requesting user role that is to receive the first name entity in obfuscated form. The content server may receive a request for the content from a first requesting user having a first requesting user role and determine, using the configuration data, that the first requesting user is to receive the first name entity in obfuscated form. The content server may replace an instance of the first name entity at the content with a first obfuscated name entity to generate first obfuscated content and serve the first obfuscated content to the requesting user.

20 Claims, 9 Drawing Sheets

OBFUSCATING CONTENT BASED ON REQUESTING USER ROLES

TECHNICAL FIELD

This document generally relates to methods and systems for use with computing systems. More particularly, this document relates to ways of obfuscating content based on requesting user roles.

BACKGROUND

Modern computing technology creates various contexts in which a user, referred to herein as a submitting user, provides content for viewing by other users, referred to herein as requesting users. Examples include social media applications, public forums or bulletin boards, as well as private or semi-private forums, such as forums or blogs hosted by a business enterprise.

BRIEF DESCRIPTION OF DRAWINGS

The present disclosure is illustrated by way of example and not limitation in the following figures.

DETAILED DESCRIPTION

Figure 1:
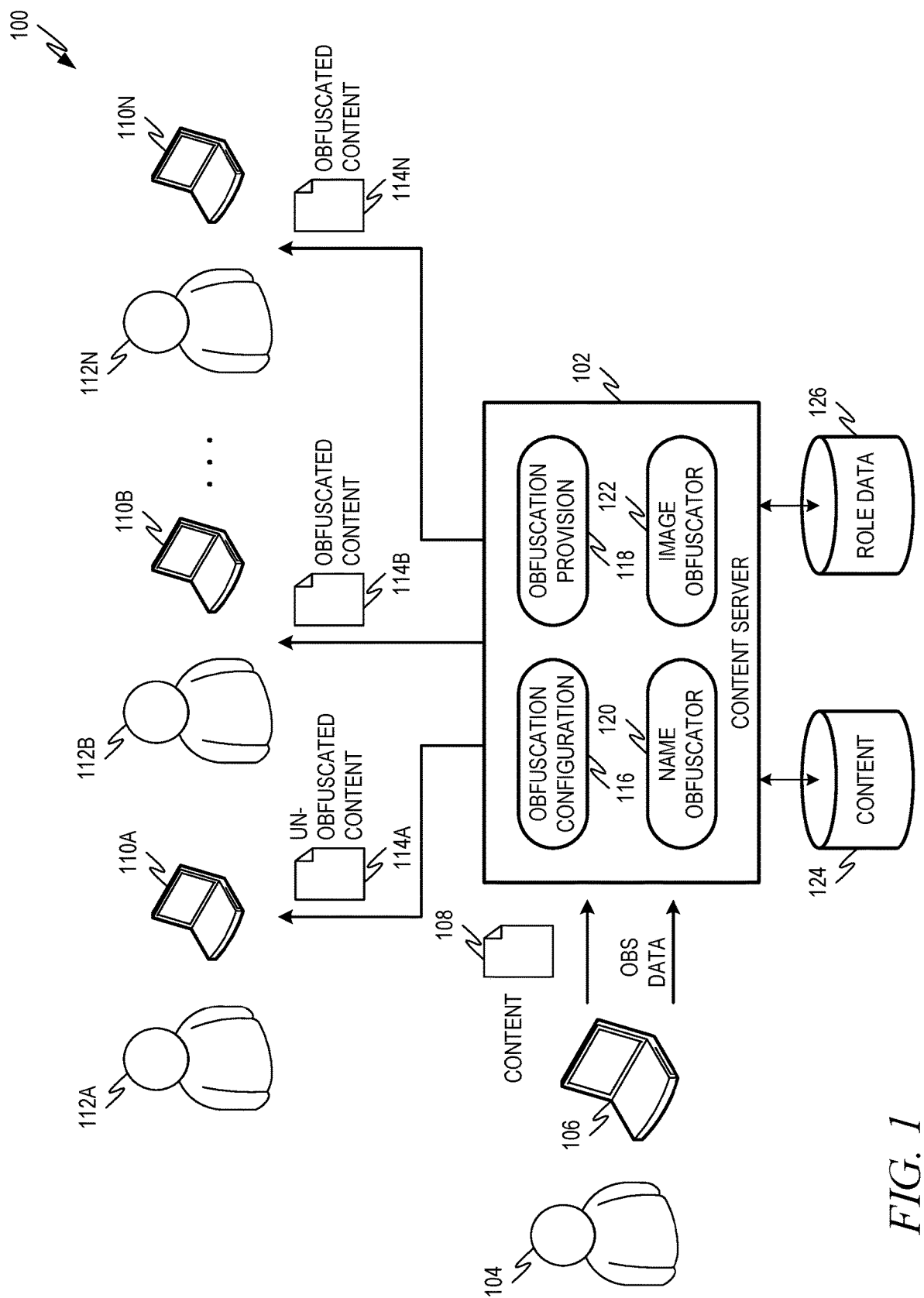
FIG. 1 is a diagram showing one example of an environment including a content server configured to obscure content based on requesting user roles, as described herein.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

A content server receives content from a submitting user and makes the content available to one or more requesting users. The content can include text, photos, or other suitable data. A requesting user requests the content from the content server. Such a request can take various forms. In some examples, the requesting user visits a blog post including the content. Other ways that the requesting user can request content include loading a social media feed, visiting a web site hosted by the content server, etc.

When the submitting user submits content to the content server, the submitting user may determine the level of security or privacy associated with the content as a whole. For example, if the submitting user deems the content to include sensitive material, the submitting user may choose not to submit the content at all. Also, in some examples, a submitting user is able to limit the requesting users who are able to request and view the content. Also, the submitting user can choose to submit the content to a content server with sensitive material in an obfuscated form. When the user submits the content to the content server with sensitive material obfuscated, however, the content server may provide the obfuscated material to all requesting users.

In some circumstances, it is desirable for a submitting user to make some portions of submitted content accessible to some requesting users while hiding the portions from other requesting users. For example, a submitting user who provides content including the names of individuals may want to make the names accessible to requesting users who have a certain relationship or relationships with the requesting user (e.g., friends, co-workers, etc.). At the same time, the requesting user may want to make the other portions of the content accessible to all users, albeit without exposing the names included in the content.

Consider another example in which a submitting user provides content that includes an image showing the faces of individuals. The submitting user may want to make the faces of the individuals accessible to requesting users who have a certain relationship or relationships with the submitting user (e.g., friends, co-workers, etc.). At the same time, the requesting user may want to make other portions of the content available to other users, albeit without showing the faces of the depicted individuals.

Various examples herein address these and other issues by obfuscating portions of submitted content based on requesting user roles. A content server is programmed to receive content from a submitting user. The content server extracts from the received content one or more name entities and/or one or more image face portions. A name entity is a string in the content that indicates the name of a person, place or thing. A face portion of an image is a portion of an image that depicts the face of an individual. Name entities and face portions are also referred to herein as sensitive material or items of sensitive material.

If one or more items of sensitive material are detected in the submitted content, the content server is programmed to access obfuscation data for the one or more items of sensitive material. Obfuscation data for an item of sensitive material indicates whether the item is to be obfuscated. If an item is to be obfuscated, the obfuscation data also includes an association between the item of sensitive material and at least one requesting user role that is to receive the item in obfuscated form. In some examples, the association includes a table or list that includes one or more requesting user roles. The association, in some examples, includes a rule that is applied to requesting user roles to determine a form of obfuscation, if any, that is to be applied to the item of sensitive material.

Obfuscation data can be retrieved from a data store and/or received from the submitting user. The content server generates configuration data for the received content. The configuration data indicates any items of sensitive material included in the content as well as association between the item of sensitive material and the at least one requesting user role that is to receive the item in obfuscated form.

The content server is also programmed to receive a request for the content from a requesting user. The requesting user is described by a requesting user role. The role may describe a function or responsibility of the requesting user (e.g., administrator, developer, etc.). In some examples, the requesting user role is relational and describes a relationship between the requesting user and the submitting user. For example, the requesting user may have a role indicating a connection between the requesting user, such as a connection, friend, co-worker, or other individual associated with the submitting user.

The content server accesses the obfuscation data for the content and determines whether the content includes any items of sensitive material that are to be obfuscated for requesting users having the requesting user's role. If no items of sensitive material are to be obfuscated, the content server serves the content to the requesting user. On the other hand, if the content includes one or more items of sensitive material that are to be obfuscated for users having the requesting user's role, the content sever generates obfuscated content in which appropriate items of sensitive material are obfuscated. For example, name entities can be obfuscated by replacing the name entities with a placeholder string or with an alternative pseudonym. Face portions of images may be obfuscated, for example, by pixelating or otherwise modifying the image to prevent the depicted face from being recognized. The obfuscated content is provided to the requesting user.

FIG. 1 is a diagram showing one example of an environment 100 including a content server 102 configured to obscure content based on requesting user roles, as described herein. The content server 102 is in communication with a submitting user 104 and requesting users 112A, 112B, 112N. The users 104, 112A, 112B, 112N utilize user computing devices 106, 110A, 110B, 110N. The user (e.g., 104, 112A, 112B, 112N) uses computing devices 106, 110A, 110B, 110N to interact with the content server 102. The user computing devices 106, 110A, 110B, 110N may be or include any suitable computing devices including, for example, desktop computers, laptop computers, tablet computers, etc. The content server 102 may be or include one or more examples of any suitable computing device such as one or more servers. The content server 102 may be implemented at a single geographic location and/or distributed across multiple geographic locations.

The content server 102 is programmed to implement a content provision service whereby content 108 is provided to the content server 102 by one or more submitting users (such as the submitting user 104) and served to the one or more requesting users 112A, 112B, 112N. The content 108 provided to the content server 102 by the submitting user 104 includes textual data and/or image data. Any suitable content provision service can be implemented using the arrangements described herein. For example, the content server 102 may implement a social media service. The submitting user 104 submits the content 108 as a post to be accessible to the one or more requesting users 112A, 112B, 112N.

In some examples, the requesting users 112A, 112B, 112N request the content from the content server, for example, by loading a social media feed. Content may be served to requesting users 112A, 112B, 112N as posts in requesting users' respective social media feeds. In other examples, the content server 102 hosts a blog. The blog may be a public blog (e.g., accessible to the general public), a private blog (e.g., accessible only to requesting users who are part of a common organization, such as a business enterprise) or a mixed blog that is accessible to the public and to users of a common organization. The submitting user 104 provides the content 108 to the content server 102 as a post. The requesting users 112A, 112B, 112N navigate a web interface or other suitable blog user interface (UI) to select posts. The content server 102 provides content to a requesting user 112A, 112B, 112N upon request. The arrangements described herein may also be implemented in the context of other types of content provision services provided by a content server 102.

The content server 102 includes an obfuscation configuration service 116 that is programmed to process the content 108 and generate corresponding obfuscation data. The obfuscation configuration service 116 extracts items of sensitive material (if any) from the content 108. The items of sensitive material may include name entities and/or face portions of images.

The obfuscation configuration service 116 may extract name entities by analyzing textual data (if any) included with the content 108. In some examples, the obfuscation configuration service 116 executes a natural language processing (NLP) technique that identifies parts of speech included in textual data. In other examples, the obfuscation configuration service 116 accesses a table or other data store that includes a list of name entities and compares the listed name entities to the string or strings included in the textual data. In still other examples, the obfuscation configuration service 116 executes a machine learning technique, such as a classification algorithm, to identify strings from the textual data that are name entities. Example classification algorithms that may be used include logistic regression, nearest neighbor, support vector machines, decision trees, random forest algorithms, neural networks, etc.

The obfuscation configuration service 116 may extract face portions by analyzing image data (if any) included with the content. The obfuscation configuration service 116 may implement and/or call any suitable face recognition service to identify face portions in the image data. In some examples, face recognition is performed utilizing a classification algorithm such as, for example, logistic regression, nearest neighbor, support vector machines, decision trees, random forest algorithms, neural networks, etc.

CODE EXAMPLE 1 below provides an example structure for extracting face portions from the content 108:

CODE EXAMPLE 1:

```
Def Structure FACE {
    faceData : binary data;
    oridinal_of_unique_face: number
    location: {
        image_identifier: string(identifier of image)
        rectangle_area : {
            left: number,
            right:number,
            width: number,
            height:number
        }
    }
}
Def Structure UNIQUE_FACE {
    face : structure FACE;
    ordinal : number;
```

CODE EXAMPLE 1:

```
        similary_indice : [ ] of number;
   }
   Let unique_faces = [ ] of STRUCTURE UNIQUE_FACE;
   Let all_faces = [ ] of STRUCTURE FACE;
   Let images= user_uploaded_images;
   Let similarity_threshold = 0.9;
   LET oridinal = 1;
   For image in images:
       Let extracted_faces = extrace_faces(image);
       LET index = sizeof(all_faces);
       all_faces.appendAll(extracted_faces);
       For face in extracted_faces:
           Let similary_face = NULL
           Let max_similarity = 0;
           For unique_face in uniqu_faces:
               LET similarity = calculate_similarity(face,
   unique_face.face;
               IF similarity > similarity_threshold:
                   IF similary_face == NULL || similarity >
   max_ similarity:
                       Let similary_face = unique_face;
                       Let max_similarity = similarity;
           If (similary_face != NULL):
               similary_face.similary_indice.append(index);
           ELSE:
               LET new_unique_face = new UNIQUE_FACE( );
               LET new_unique_face.face = face;
               LET new_unique_face.similary_indice = [index];
               LET new_unique_face.oridinal = oridinal;
               LET oridinal = oridinal + 1;
               unique_faces.append(unique_face);
           Index++;
```

In CODE EXAMPLE 1, the obfuscation configuration service 116 operates on each image in the content 108 to extract face portions. The obfuscation configuration service 116 then examines all of the extracted faces to identify unique face portions. For example, the content 108 may include face portions depicting the same face in different images. In some examples, face portions showing the same face may be treated the same.

Upon identifying items of sensitive material at the content 108, the obfuscation configuration service 116 determines, for each identified item of sensitive material, whether that item is to be obfuscated and for which requesting user roles the item is to be obfuscated. The determination can be based on stored data from an existing data store. For example, the content server 102 may maintain data in the form or rules or other data indicating different categories or classifications of sensitive material and corresponding obfuscation (if any) and requesting user roles. In other examples, the obfuscation configuration service 116 receives obfuscation data from the submitting user 104. The obfuscation configuration service 116 prompts the submitting user 104 to indicate, for each item of sensitive material and/or for each category of sensitive material, whether the sensitive material is to be obfuscated and for which requesting user roles it is to be obfuscated.

The obfuscation configuration service 116 generates configuration data for the received content 108. The configuration data associates the items of sensitive material in the content 108 with one or more requesting user roles. The association between items of sensitive material and requesting user roles can be expressed in various different forms. In some examples, the association is expressed as one or more rules (e.g., requesting users have requesting user role X are entitled to view items of type A if the items are in a first obfuscated form).

In some examples, the configuration data comprises a number of obfuscation items, where each obfuscation item corresponds to an item of sensitive material or categories of sensitive material items. An obfuscation item may also be associated with an obfuscation rule, where the rule ties a type of access to items of sensitive material to one or more requesting user roles. The pseudocode of CODE EXAMPLE 2 below provides one example structure for configuration data that includes obfuscation items and obfuscation rules. CODE EXAMPLE 2 describes name entities as the items of sensitive material, although a similar structure may be used for face portions, as described herein.

CODE EXAMPLE 2

```
Def Structure NameEntity {
    name : STRING;   // the name of the name entity
    locations: NUMBER [ ]; //the locations where the name
appear in the content.
}
Def Structure Obfuscation_Rule {
    Roles: ROLE_ID;
    obfuscation_method: asterisks; // the obfuscation
method to apply for this name
}
Def Structure Obfuscation_Item {
    nameEntity : NameEntity;
    rules: Obfuscation_Rule [ ]
}
Def Structure Obfuscation_Matrix : Obfuscation_Item [ ].
```

In this example, the structure NameEntity II identifies a name entity and also indicates the locations where the name entity appears in content. The structure Obfuscation_ Rule{ } indicates one or more roles and, in this example, specifies an obfuscation method to be applied to place the name entity in a particular obfuscated form, as described in more detail herein. The structure Obfuscation_Item { } in this example, identifies a name entity but can also indicate a face portion in some examples.

In some examples, the configuration data for content can be expressed as a matrix, for example, as shown in TABLE 1 below:

TABLE 1

| Items of Sensitive Information | Requesting User Role 1 | Requesting User Role 2 | Requesting User Role 3 |
|---|---|---|---|
| Face Portion 1 (clear) | X | | |
| Face Portion 1 (obfuscated) | | X | X |
| Face Portion 2 (obfuscated) | X | X | X |

In TABLE 1, the items of sensitive material in the left-most column are face portions. The remaining columns indicate requesting user roles. In this example, requesting users having Requesting User Role 1 receive Face Portion 1 in a clear or un-obfuscated form. Requesting users having Requesting User Role 2 or Requesting User Role 3 receive the Face Portion 1 in an obfuscated form. Face Portion 2 is received by all of the indicated requesting user roles in an obfuscated form. The received content 108 along with configuration data is stored at a content data store 124 associated with the content server 102.

The content server 102 also comprises a name obfuscator service 120 and an image obfuscator service 122. The name obfuscator service 120 is configured to generate obfuscated name entities that can be used to replace name entities in the content 108 to generate obfuscated content 114B, 114N as described herein. The name obfuscator service 120 can be configured to obfuscate name entities into various different forms. In some examples, the name obfuscator service 120 generates obfuscated names by replacing a name entity with a set of nonce characters, such as "*," "#" or other suitable characters. In another example, the name obfuscator service 120 generates an obfuscated name by replacing a name entity with a pseudonym. The pseudonym may be selected based on the replaced name entity and/or independent of the name entity. In some examples, the pseudonym is randomly selected.

The image obfuscator service 122 is configured to obfuscate face portions, for example, by pixelating the face portions. Pixelation can be performed in any suitable manner. For example, the image obfuscator 122 may determine blocks of pixels from a face portion and assign to each pixel in the block a value that is an average of the values for the pixels in the original image. Other suitable techniques may also be used.

CODE EXAMPLE 3 below provides pseudocode for generating obfuscated face portions:

```
CODE EXAMPLE 3:

FUNCTION pixelate_images(image, all_faces,
faces_ordinals_to_pixelate):
    LET faces_to_pixelate = [ ];
    FOR face in all_faces:
        // check if is face is in the image
        IF face.location.image_identifier ==
image.identifier:
            //check if the face needs to be pixelated
            IF face.unique_oridinal IN
faces_ordinals_to_pixelate:
                faces_to_pixelate.append(face);
        FOR face IN faces_to_pixelate:
            CALL pixelate_image(image,
face.location.rectangle_area);
```

Requests for content can be handled at the content server 102 by an obfuscation provision service 118. The content server 102 (obfuscation provision service 118) receives requests for content from the requesting users 112A, 112B, 112N. Upon receiving a request for the content, the obfuscation provision service 118 accesses configuration data for the requested content. The obfuscation provision service 118 also accesses role data describing a requesting user role of the requesting user 112A, 112B, 112N. Using the configuration data and the role data, the obfuscation provision service 118 determines a form in which the requesting user 112A, 112B, 112N is to receive the content.

The pseudocode of CODE EXAMPLE 4 below shows a function, Obfuscation_Decision{ }, for making a decision on whether and how to obfuscate items of sensitive material in response to a request for content from a requesting user 112A, 112B, 112N:

```
CODE EXAMPLE 4:

Def STRUCTURE Obfuscation_Decision {
    nameEntity : NameEntity;
    obfuscation_method: Obfuscation Method;
}
Obfuscation_Decision [ ] get_obfuscation_configuration_item(
    roles : Role ID[ ],
    obfuscation_config_data :  Obfuscation_Configuration
```

```
CODE EXAMPLE 4:
-continued

Data
) {
    LET decisions = [ ] of Obfuscation_Decision;
    FOR item in Obfuscation_Config_Data :
        FOR rule in item.rules:
            If rule.role in roles :
                Let decision = new
Obfuscation_Decision( );
                Let decision.nameEntity =
item.nameEntity;
                Let decision. obfuscation_method =
rule. obfuscation_method;
                Decisions.append(decision);
    RETURN decisions;
}
```

In this example, each item of sensitive material is described in the configuration data by a rule. Applying the rule to the request provides an indication of whether obfuscation of the item is to occur for a given requesting user role and, if so, what obfuscation method is to be used (e.g., which obfuscation form the item will be in after obfuscation). CODE EXAMPLE 4 deals with name entity items of sensitive material, although similar logic could be applied for items of sensitive material that include face portions.

In the example of FIG. 1, each of the requesting users 112A, 112B, 112N requests the content 108 provided by the submitting user 104. The requesting users 112A, 112B, 112N have respective requesting user roles. The requesting user roles may indicate a position of the first requesting user 112A such as, for example, administrator, user, etc. In some examples, the requesting users 112A, 112B, 112N have requesting user roles that are relational roles that indicate a relationship between the respective requesting users 112A, 112B, 112N and the submitting user 104 (e.g., the submitting user that submitted the requested content 108). Examples of relational requesting user roles include friend, connection, etc. In some examples, there are different levels of relational requesting user roles that may have differing levels of access to items of sensitive material. For example, the user 112A may be a first level connection of the submitting user 104 while the user 112B may be a second level connection. Different levels of connections may be structured and/or expressed in various ways. For example, one level of connections may be labeled "family" while another level of connections may be labeled "friend."

In the example of FIG. 1, the requesting user 112A has a requesting user role that entitles the requesting user 112A to view all of the items of sensitive material in the content 108. For example, the configuration data for the content 108 may indicate that the requesting user role of the requesting user 112A can receive all of the items of sensitive material in the content 108 without obfuscation. Accordingly, the obfuscation provision service 118 provides the requesting user 112A with un-obfuscated content 114A. The un-obfuscated content 114A includes all of the items of the content 108 in un-obfuscated form.

In the example of FIG. 1, the requesting user 112B has a requesting user role that entitles the requesting user 112B to view only obfuscated versions of at least some of the items of sensitive material in the content 108. For example, the configuration data for the content 108 may indicate that at least one of the items of sensitive material of the content 108 should be obfuscated for the requesting user 112B. Accordingly, the obfuscation provision service 118 generates obfuscated content 114B. For example, the obfuscation provision service 118 replaces at least one name entity with an obfuscated name entity and/or at least one face portion with an obfuscated face portion. The obfuscated content 114B is provided to the requesting user 112B.

In the example of FIG. 1, the requesting user 112N has a requesting user role that is different than that of the requesting user 112A or the requesting user 112B. The requesting user role of the requesting user 112N entitles the requesting user 112N to view only obfuscated versions of at least some of the items of sensitive material in the content 108. In this example, the entitlements of the requesting user 112N are different than those of the requesting user 112B. For example, the requesting user 112N may be entitled to receive the content 108 with different items of sensitive data obfuscated than were obfuscated for the requesting user 112B. The configuration data for the content 108 may indicate that at least one of the items of sensitive material of the content 108 should be obfuscated for the requesting user 112N. Accordingly, the obfuscation provision service 118 generates obfuscated content 114N. For example, the obfuscation provision service 118 replaces at least one name entity with an obfuscated name entity and/or at least one face portion with an obfuscated face portion. The obfuscated content 114N is provided to the requesting user 112N.

In some examples, the requesting user 112N is entitled to receive the content with some items of sensitive material from the content 108 in a different obfuscated form than what was provided to the requesting user 112B. For example, the requesting user 112B may receive examples of a first name entity in an obfuscated form that includes a series of nonce characters while the requesting user 112N receives examples of the first name entity in an obfuscated form that includes a pseudonym.

Figure 2:
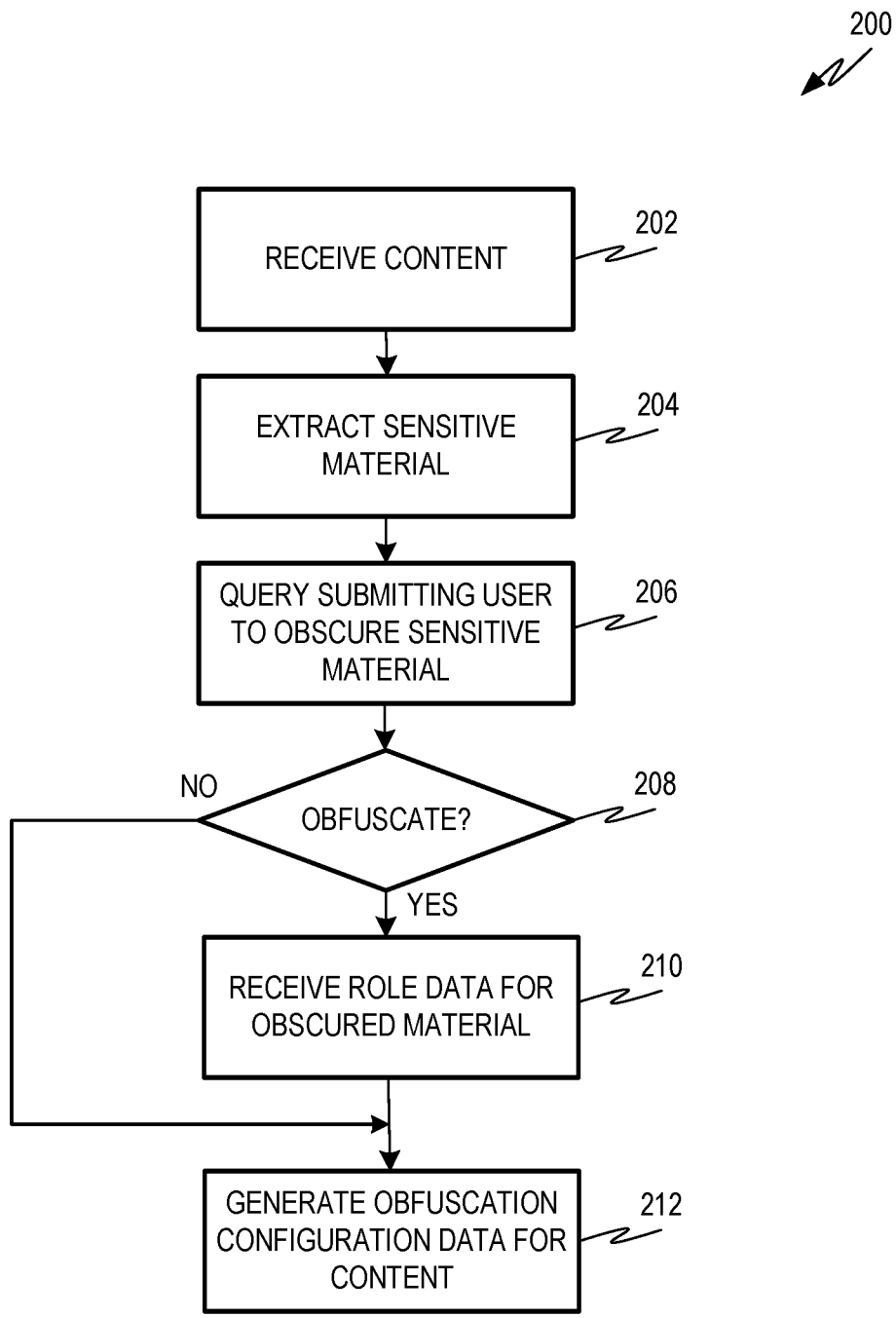
FIG. 2 is a flowchart showing one example of a process flow that may be executed by the content server of FIG. 1 upon receiving content.

FIG. 2 is a flowchart showing one example of a process flow 200 that may be executed by the content server 102 (e.g., the obfuscation configuration service 116 thereof) upon receiving content 108. At operation 202, the content server 102 receives content 108. At operation 204, the content server 102 extracts items of sensitive material, if any, from the content 108. This includes identifying name entities and/or face portions in the content 108, for example, as described herein.

At operation 206, the content server 102 queries the submitting user 104 to indicate an extracted item or items of sensitive material that is to be obscured. This can include providing some or all of the extracted item or items of sensitive material to the submitting user 104. The submitting user 104 may indicate whether an item of sensitive material is to be obfuscated. If any items of sensitive material are to be obfuscated at operation 208, the content server 102 receives requesting user role data at operation 210. The requesting user role data indicates which requesting user roles will receive obfuscated versions of the item or items identified for obfuscation at operation 206. In some examples, the content server 102 queries the submitting user 104 to indicate the requesting user role or roles for which the identified item or items of sensitive material will be obfuscated.

Upon receiving the role data at operation 210, and/or after determining that no items of sensitive material are to be obfuscated at operation 208, the content server generates configuration data for the received content 108 at operation 212. The configuration data indicates, for each item of sensitive material in the content 108, requesting user roles for which the item should be obfuscated and an obfuscation method or form for the respective requesting user roles. The configuration data is stored, for example, with the content, at the content data store 124. In some examples, obscured forms of one or more of the items of sensitive information are also generated and stored with the content for later use while serving content to the respective requesting users 112A, 112B, 112N.

Figure 3:
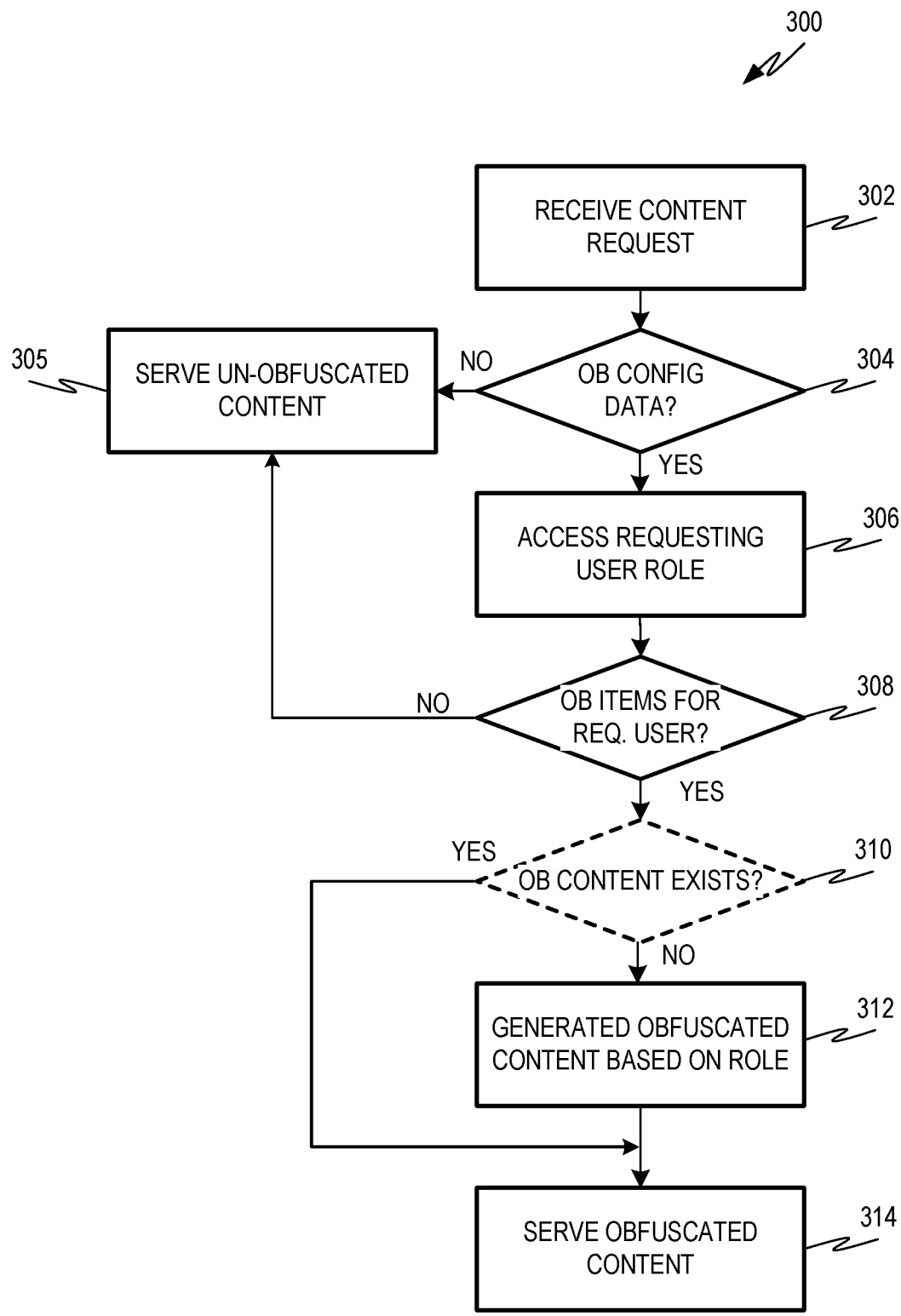
FIG. 3 is a flowchart showing one example of a process flow that may be executed by the content server of FIG. 1 to respond to a request for content from a requesting user.

FIG. 3 is a flowchart showing one example of a process flow 300 that may be executed by the content server 102 (e.g., the obfuscation provision service 118 thereof) to respond to a request for content from a requesting user, such as the requesting users 112A, 112B, 112N.

At operation 302, the content server 102 receives a request for content, such as the content 108. At operation 304, the content server 102 determines whether there is configuration data associated with the requested content. If there is no configuration data for the requested content, it may indicate that the requested content does not include items of sensitive information. The content server 102 serves the un-obfuscated content to the requesting user at operation 305.

If there is configuration data for the requested content, the content server 102 accesses the configuration data and obtains the requesting user role for the requesting user at operation 306. At operation 308, the content server determines, using the configuration data, whether there are any items of sensitive material in the requested content that are to be obfuscated for requesting users having the requesting user role of the requesting user. If not, the content server 102 serves the un-obfuscated content to the requesting user at operation 305.

If there are items to be obfuscated, the content server optionally determines, at operation 310 whether the relevant obfuscated items have been previously generated (e.g., in the obfuscated form specified for the requesting user by the configuration data). If not, the content server generates obfuscated versions of the relevant items of sensitive material at operation 312.

If the called-for obfuscated form of the items exists at operation 310, or after generating the called-for obfuscated form of the items of sensitive information, the content server 102 generates obfuscated content by replacing the relevant item or items of sensitive information with corresponding obfuscated forms. The resulting obfuscated content is served to the requesting user at operation 314.

Figure 4:
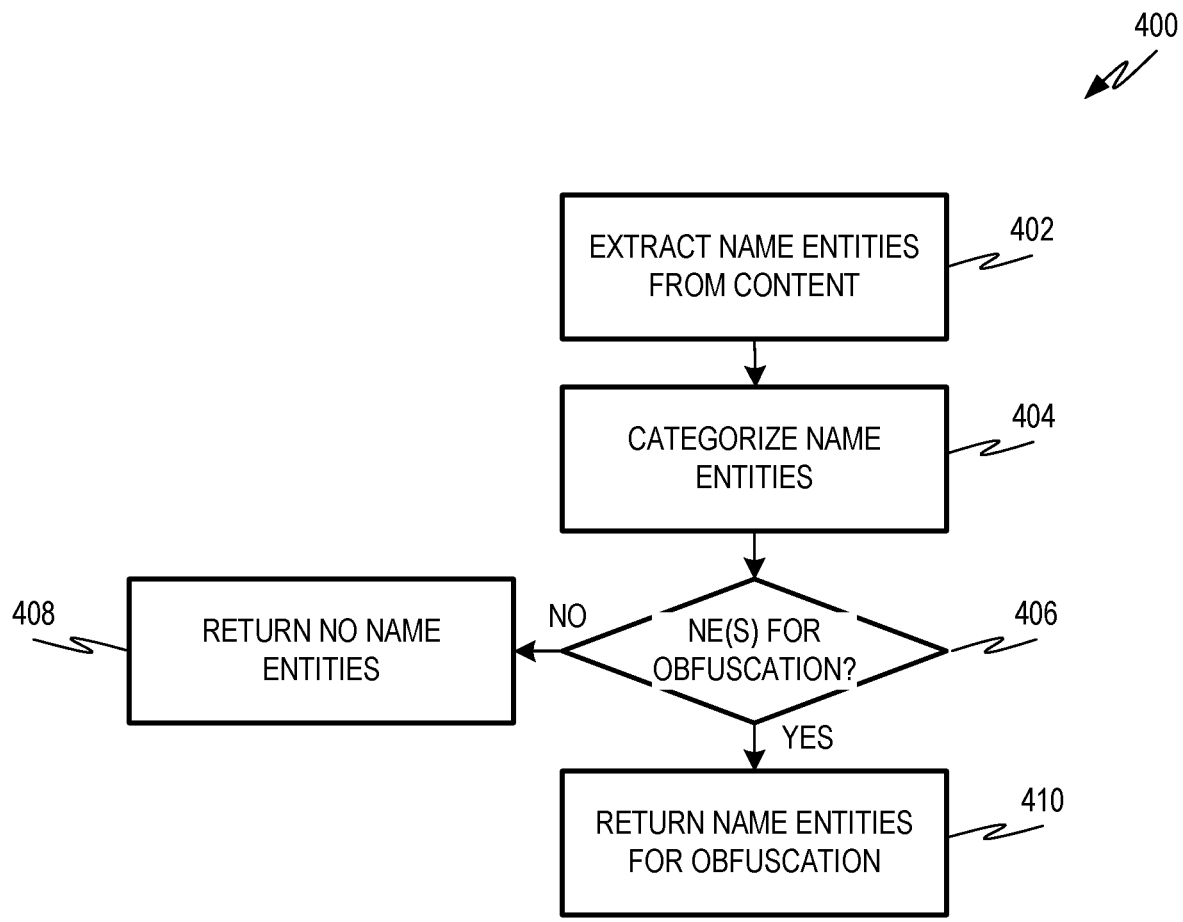
FIG. 4 is a flowchart showing one example of a process flow that may be executed by the content server of FIG. 1 to extract name entities from content.

FIG. 4 is a flowchart showing one example of a process flow 400 that may be executed by the content server 102 (e.g., the obfuscation configuration service 116 thereof) to extract name entities from content. For example, the process flow 400 shows one example way that the content server 102 can execute the operation 204 of FIG. 2 with respect to name entities. At operation 402, the content server 102 extracts name entities from the content.

At operation 404, the content server 102 categorizes the name entities. The categories to which a name entity is assigned may correspond to different levels of sensitivity and/or different potentials for sensitivity. Example name entity categories are given by TABLE 2 below:

TABLE 2

| Category |
| --- |
| Name of person(Normal name) |
| Name of person(public well-known name) |
| Location Name |
| Company Name |

The content server 102 can categorize the name entities in any suitable manner. For example, the content server 102 may maintain or otherwise access a database including names of public people, locations, companies, etc.

Different categories of names can be subjected to differing levels of obfuscation. For example, some name entities, such as the names of publicly well-known people or locations, may not require obfuscation. Other categories, such as the names of people who are not publicly known, the names of companies, etc., may be potentially obfuscatable, for example, based on the preferences of the submitting user 104. At operation 406, the content server 102 determines, based on the categories assigned at operation 404, whether there are any potentially obfuscatable name entities. If not, the content server 102 returns no name entities at operation 408. If yes, the name entities are returned for obfuscation at operation 410. Name entities returned for obfuscation may be processed, for example, as described above with respect to operations 206 and so on of the process flow 200.

Figure 5:
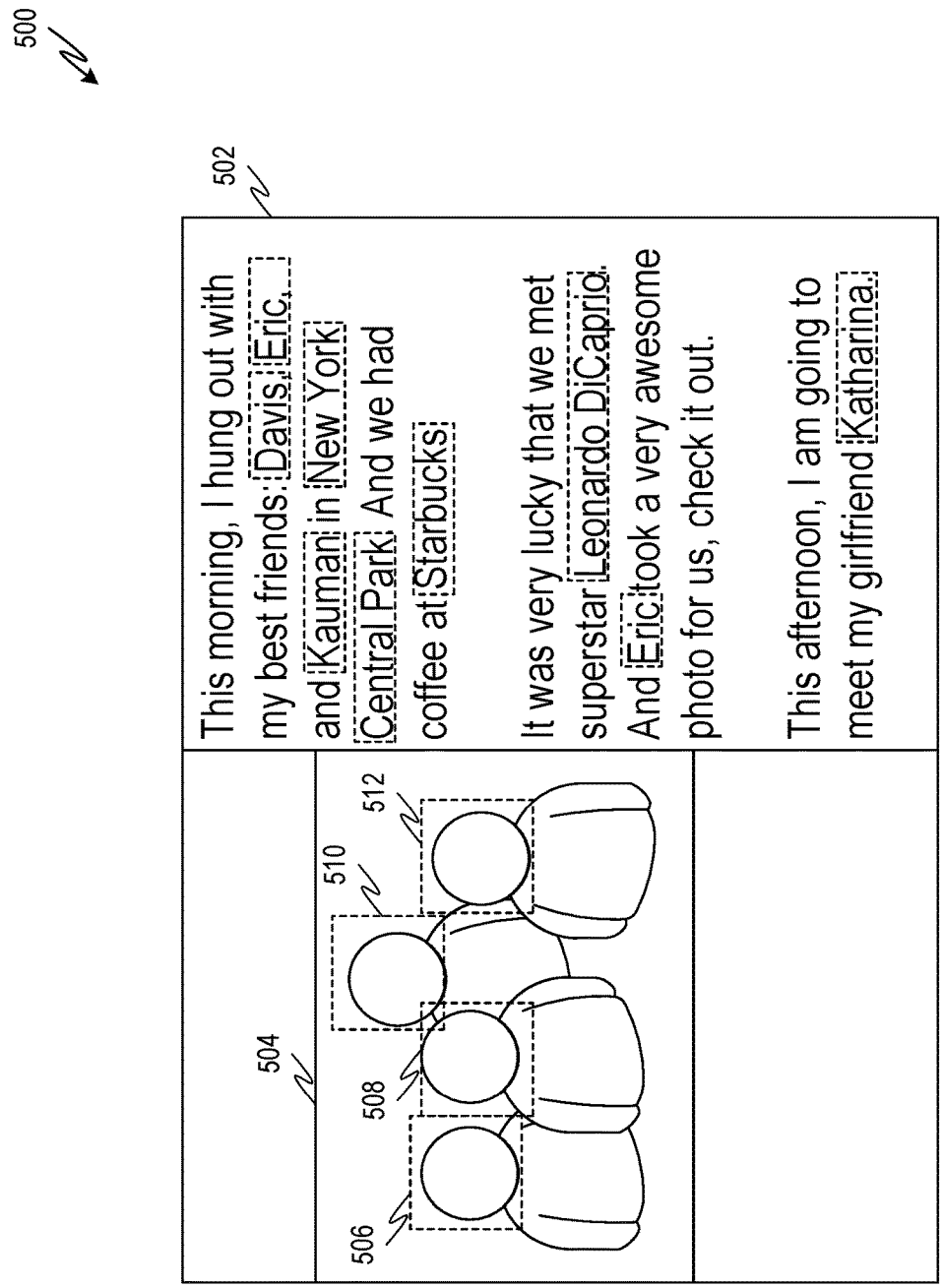
FIG. 5 is a diagram showing example content to demonstrate an example of the arrangements described herein.

FIG. 5 is a diagram showing example content 500 to demonstrate an example of the arrangements described herein. The content 500 is received from a submitting user 104 and includes text data 502 as well as image data 504. The image data 504 includes face portions 506, 508, 510, 512. The text data 502 includes name entities "Davis," "Eric," "Kauman," "New York," "Central Park," "Starbucks," "Leonardo DiCaprio," and "Katharina." The name entity "Eric" appears twice, as shown.

When the example content 500 is received by the content server 102, the content server 102 identifies items of sensitive material including face portions 506, 508, 510, 512 and the name entities indicated above at text data 502. In some examples, as described herein with respect to FIG. 4, the content server categories the name entities, for example, as indicated by TABLE 3 below:

TABLE 3

| Category | Name Entities |
| --- | --- |
| Name of person(Normal name) | Davis |
| | Kauman |
| | Eric |
| | Katharina |
| Name of person(public well-known name) | Leonardo DiCaprio |
| Location Name | New York |
| | Central Park |
| Company Name | Starbucks |

In some examples, one or more of the categories of name entities may not be obfuscatable. For example, the company name "Starbucks" may not be obfuscatable. If this is the case, the name entity "Starbucks" may not be considered further for obfuscation.

The content server 102 generates configuration data for the content 500 as described herein. For example, the obfuscation server 102 may query the submitting user 104 to provide requesting user roles and corresponding obfuscation methods/forms for the identified items. When the content 500 is requested by a requesting user, the content server 102 serves the content 500 and/or generates obfuscated content.

Figure 6:
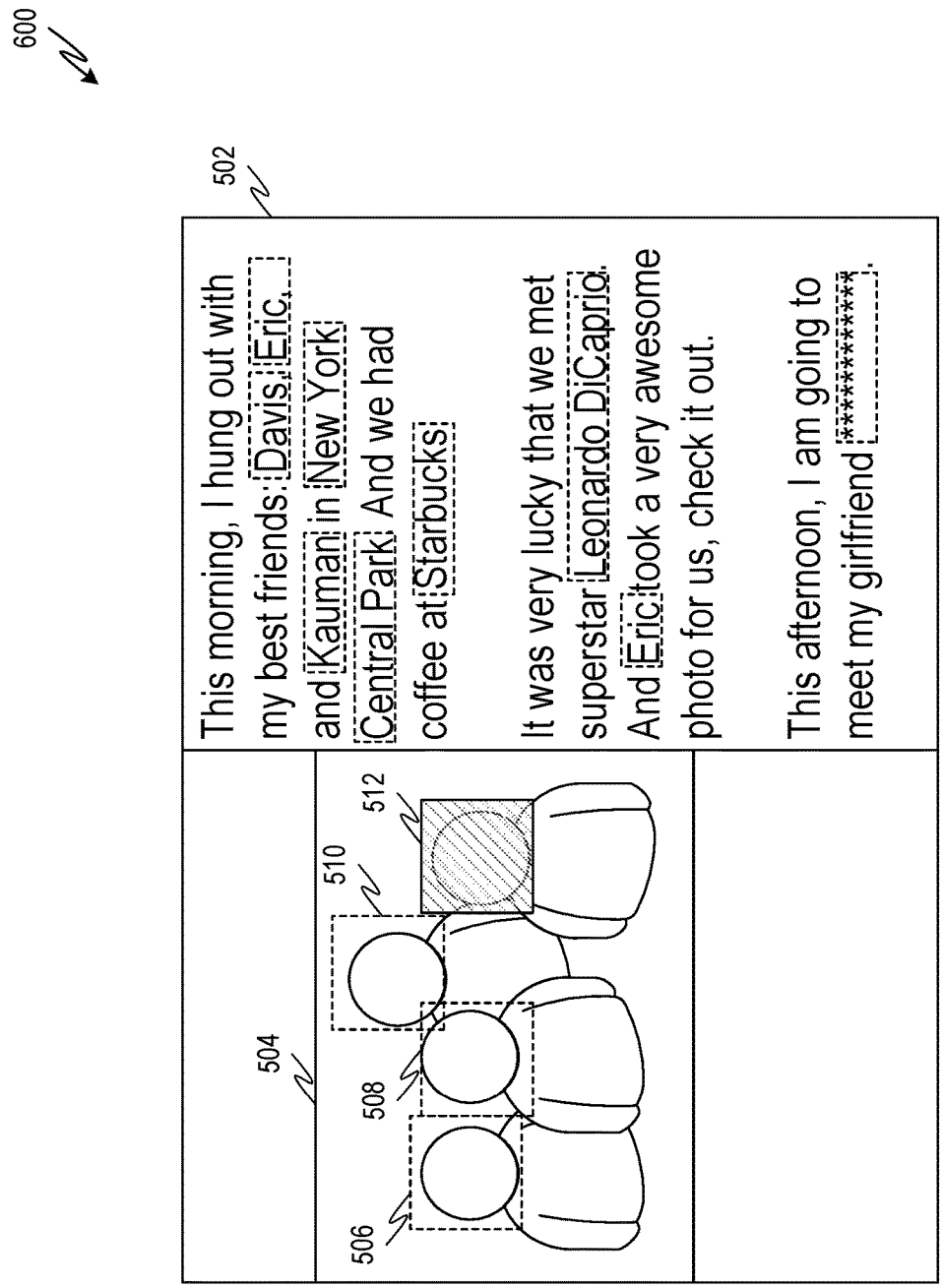
FIG. 6 is a diagram showing example obfuscated content generated by the content server from the content of FIG. 5 for a requesting user having a first requesting user role.

FIG. 6 is a diagram showing example obfuscated content 600 generated by the content server 102 from the content 500 for a requesting user having a first requesting user role. In this example, the name entity "Kathrina" is presented in an obfuscated form, here a series of nonce characters "*." The face portion 512 is also presented in an obfuscated form. Other items are presented in un-obfuscated form. The requesting user 112A, 112B, 112N who receives the obfuscated content 600 may have a requesting user role that allows the requesting user to see some, but not all, of the items in un-obfuscated form. For example, the requesting user 112A, 112B, 112N who receives the obfuscated content 600 may be a friend or connection of the submitting user 104.

Figure 7:
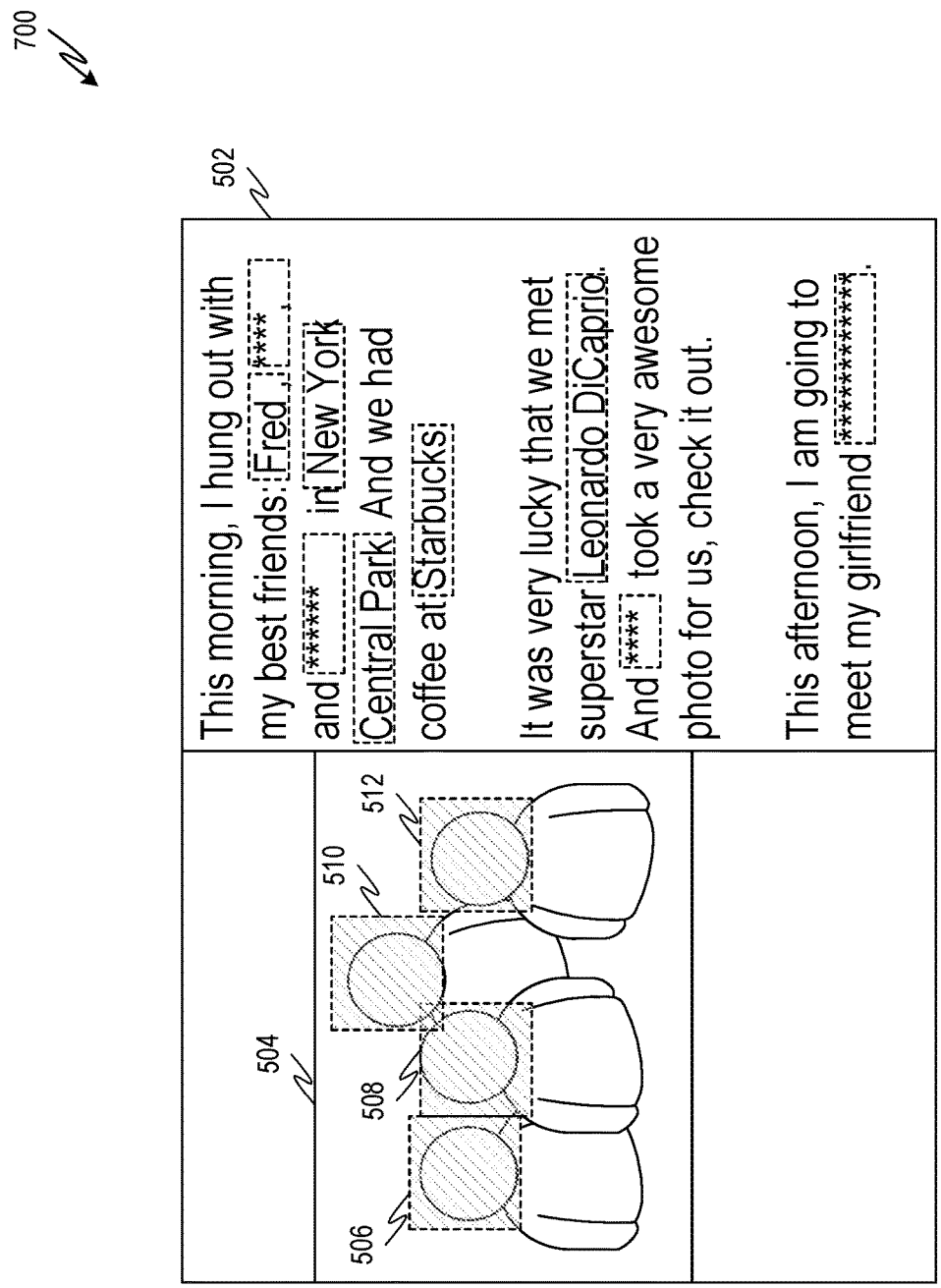
FIG. 7 is a diagram showing another example of obfuscated content generated by the content server from the content of FIG. 5 for a requesting user having a second requesting user role.

FIG. 7 is a diagram showing another example of obfuscated content 700 generated by the content server 102 from the content 500 for a requesting user having a second requesting user role different than the first requesting user role of FIG. 6. In this example, the name entities "Kathrina," "Davis," "Eric," and "Kauman" are presented in obfuscated form along with all of the face portions 506, 508, 510, 512. In this example, the name entities "Kathrina," "Eric," and "Kauman" are presented in an obfuscated form that includes a series of nonce characters "*." The name entity "Davis" is presented in an obfuscated form that includes a pseudonym, in this example "Fred." The requesting user 112A, 112B, 112N who receives the obfuscated content 700 may have a requesting user role that does not permit the requesting user 112A, 112B, 112N to receive any of the obfuscated items in un-obfuscated form. For example, the requesting user 112A, 112B, 112N who receives the obfuscated content 700 may not have a requesting user role indicating a connection or relation to the submitting user 104.

Examples

Example 1 is a content server system, comprising: at least one processor programmed to perform operations comprising: receiving content from a submitting user; extracting a first name entity from the content, the first name entity comprising a string indicating a name; generating configuration data for the content, the configuration data comprising an association between the first name entity and at least one requesting user role that is to receive the first name entity in obfuscated form; receiving a first request for the content from a first requesting user, the first requesting user having a first requesting user role; determining and using the configuration data, that the first requesting user is to receive the first name entity in obfuscated form; replacing an instance of the first name entity at the content with a first obfuscated name entity to generate first obfuscated content; and serving the first obfuscated content to the first requesting user.

In Example 2, the subject matter of Example 1 optionally includes the operations further comprising: receiving a second request for the content from a second requesting user, the second requesting user having a second requesting user role; replacing the instance of the first name entity at the content with a second obfuscated name entity different than the first obfuscated name entity to generate second obfuscated content; and serving the second obfuscated content to the second requesting user.

In Example 3, the subject matter of any one or more of Examples 1-2 optionally includes the operations further comprising: extracting a plurality of name entities from the content, the plurality of name entities comprising the first name entity; assigning the first name entity to a first category, wherein the configuration data indicates that requesting users having the first requesting user role have a first level of access to name entities of the first category; and assigning a second name entity of the plurality of name entities to a second category, wherein the configuration data also indicates that the first requesting user has a second level of access to name entities of the second category.

In Example 4, the subject matter of any one or more of Examples 1-3 optionally includes the operations further comprising extracting a second name entity from the content, wherein the first obfuscated content includes the second name entity in an un-obfuscated form.

In Example 5, the subject matter of any one or more of Examples 1-4 optionally includes the operations further comprising: providing an indication of the first name entity to the submitting user; and receiving, from the submitting user, an association between the first requesting user role and the first name entity.

In Example 6, the subject matter of any one or more of Examples 1-5 optionally includes the operations further comprising: determining that the content comprises a first image; extracting a first face portion from the first image, the first face portion depicting a face; and receiving, from the submitting user, an association between the first face portion and a second requesting user role, wherein the configuration data indicates the association between the first face portion and the second requesting user role.

In Example 7, the subject matter of Example 6 optionally includes the operations further comprising providing, to the submitting user, an indication of the first face portion, wherein the association between the first face portion and the second requesting user role is received in response to the providing of the indication of the first face.

In Example 8, the subject matter of any one or more of Examples 6-7 optionally includes the operations further comprising: determining that the first requesting user does not have the second requesting user role, wherein the first obfuscated content is also generated at least in part by replacing the first face portion with a first obfuscated face portion.

In Example 9, the subject matter of any one or more of Examples 1-8 optionally includes the operations further comprising: determining that the content comprises a first image; extracting a plurality of face portions from the first image, the plurality of face portions comprising a first face portion depicting a first face and a second face portion depicting a second face; receiving, from the submitting user, an association between the first face portion and a second requesting user role, wherein the obfuscation data indicates the association between the first face portion and the second requesting user role; and receiving, from the submitting user, an association between the second face portion and a third requesting user role, wherein the obfuscation data indicates the association between the second face portion and the third requesting user role.

In Example 10, the subject matter of Example 9 optionally includes the operations further comprising: determining that the first requesting user has the second requesting user role; and determining that the first requesting user does not have the third requesting user role, wherein the first obfuscated content is also generated at least in part by replacing the second face portion with a second obfuscated face portion, and wherein the first obfuscated content includes the first face portion in an un-obfuscated form.

Example 11 is a method of serving shared content, the method comprising: receiving content, by a content server and from a submitting user; extracting, by the content server, a first name entity from the content, the first name entity comprising a string indicating a name; generating, by the content server, configuration data for the content, the configuration data comprising an association between the first name entity and at least one requesting user role that is to receive the first name entity in obfuscated form; receiving, by the content server, a first request for the content from a first requesting user, the first requesting user having a first requesting user role; determining, by the content server and using the configuration data, that the first requesting user is to receive the first name entity in obfuscated form; replacing, by the content server, an instance of the first name entity at the content with a first obfuscated name entity to generate first obfuscated content; and serving, by the content server, the first obfuscated content to the requesting user by the content server.

In Example 12, the subject matter of Example 11 optionally includes receiving, by the content server, a second request for the content from a second requesting user, the second requesting user having a second requesting user role; replacing, by the content server, the instance of the first name entity at the content with a second obfuscated name entity different than the first obfuscated name entity to generate second obfuscated content; and serving, by the content server, the second obfuscated content to the second requesting user.

In Example 13, the subject matter of any one or more of Examples 11-12 optionally includes extracting a plurality of name entities from the content, the plurality of name entities comprising the first name entity; assigning the first name entity to a first category, wherein the configuration data indicates that requesting users having the first requesting user role have a first level of access to name entities of the first category; and assigning a second name entity of the plurality of name entities to a second category, wherein the configuration data also indicates that the first requesting user role has a second level of access to name entities of the second category.

In Example 14, the subject matter of any one or more of Examples 11-13 optionally includes extracting a second name entity from the content, wherein the first obfuscated content includes the second name entity in an un-obfuscated form.

In Example 15, the subject matter of any one or more of Examples 11-14 optionally includes providing, by the content server, an indication of the first name entity to the submitting user; and receiving, from the submitting user, an association between the first requesting user role and the first name entity.

In Example 16, the subject matter of any one or more of Examples 11-15 optionally includes determining, by the content server, that the content comprises a first image; extracting, by the content server, a first face portion from the first image, the first face portion depicting a face; and receiving, from the submitting user, an association between the first face portion and a second requesting user role, wherein the configuration data indicates the association between the first face portion and the second requesting user role.

In Example 17, the subject matter of Example 16 optionally includes providing, by the content server and to the submitting user, an indication of the first face portion, wherein the association between the first face portion and the second requesting user role is received in response to the providing of the indication of the first face.

In Example 18, the subject matter of any one or more of Examples 11-17 optionally includes determining, by the content server, that the content comprises a first image; extracting, by the content server, a plurality of face portions from the first image, the plurality of face portions comprising a first face portion depicting a first face and a second face portion depicting a second face; receiving, from the submitting user, an association between the first face portion and a second requesting user role, wherein the obfuscation data indicates the association between the first face portion and the second requesting user role; and receiving, from the submitting user, an association between the second face portion and a third requesting user role, wherein the obfuscation data indicates the association between the second face portion and the third requesting user role.

In Example 19, the subject matter of Example 18 optionally includes determining, by the content server, that the first requesting user has the second requesting user role; and determining, by the content server, that the first requesting user does not have the third requesting user role, wherein the first obfuscated content is also generated at least in part by replacing the second face portion with a second obfuscated face portion, and wherein the first obfuscated content includes the first face portion in an un-obfuscated form.

Example 20 is a non-transitory machine-readable medium having instructions thereon that, when executed by at least one processor, cause the at least one processor to perform operations comprising: receiving content from a submitting user; extracting a first name entity from the content, the first name entity comprising a string indicating a name; generating configuration data for the content, the configuration data comprising an association between the first name entity and at least one requesting user role that is to receive the first name entity in obfuscated form; receiving a first request for the content from a first requesting user, the first requesting user having a first requesting user role; determining and using the configuration data, that the first requesting user is to receive the first name entity in obfuscated form; replacing an instance of the first name entity at the content with a first obfuscated name entity to generate first obfuscated content; and serving the first obfuscated content to the requesting user.

Figure 8:
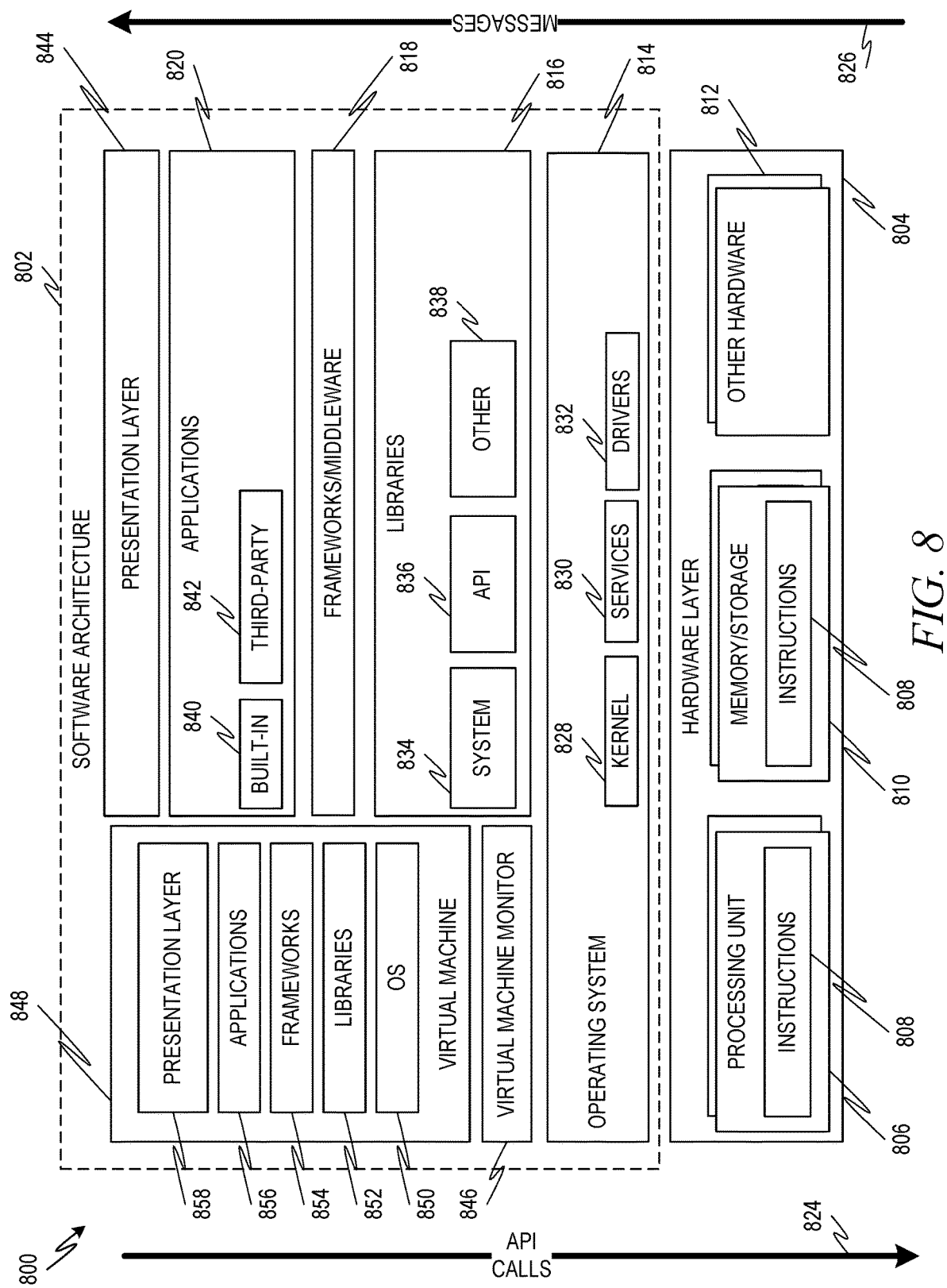
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the software architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system 834, APIs 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
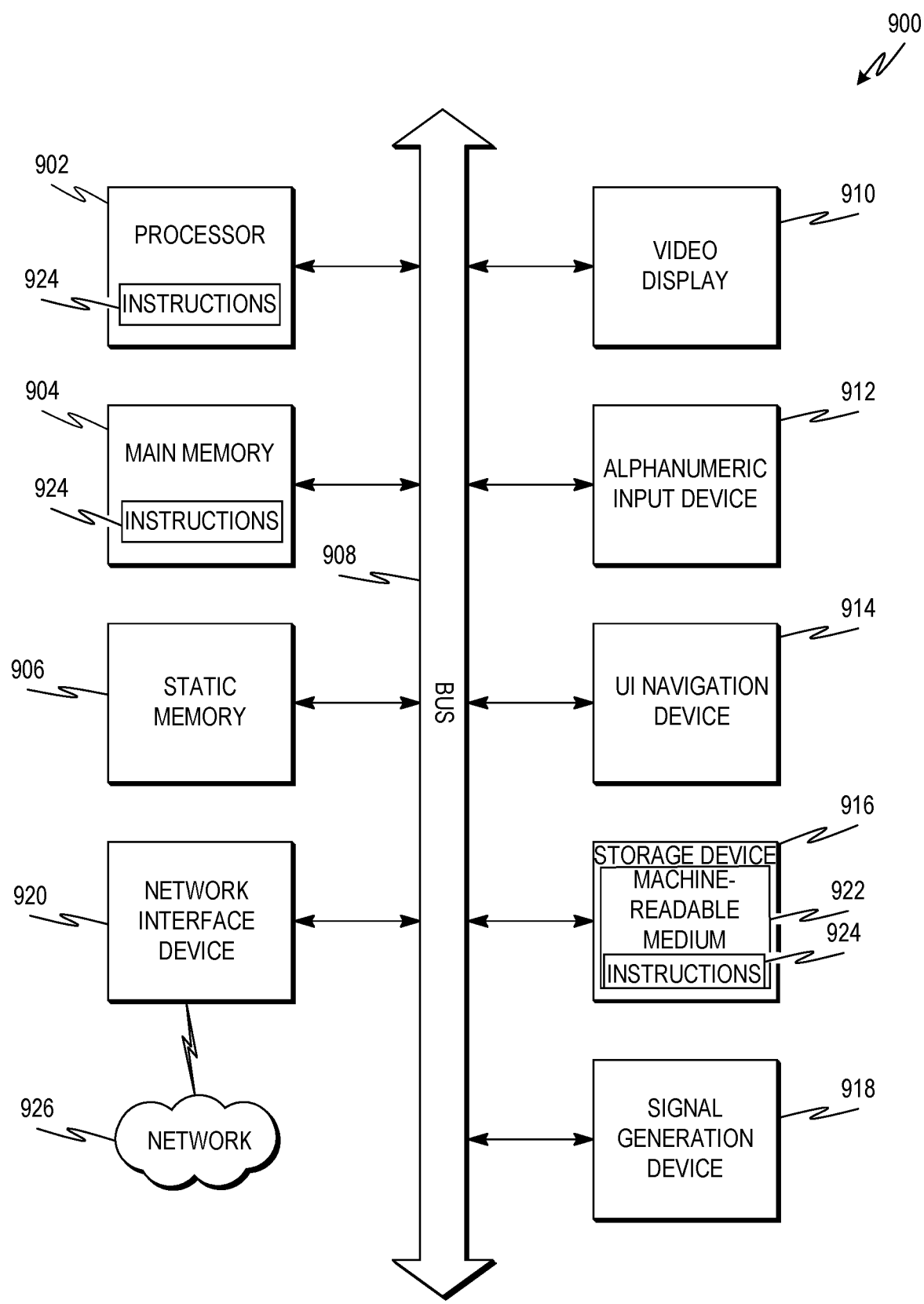
FIG. 9 is a block diagram of a machine in the example form of a computing system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A content server system, comprising:
    at least one processor programmed to perform operations comprising:
        receiving content from a submitting user;
        extracting a first name entity from the content, the first name entity comprising a string indicating a name;
        generating configuration data for the content, the configuration data comprising an association between the first name entity and at least one requesting user role that is to receive the first name entity in obfuscated form;
        receiving a first request for the content from a first requesting user, the first requesting user having a first requesting user role;
        determining and using the configuration data, that the first requesting user is to receive the first name entity in obfuscated form;
        replacing an instance of the first name entity at the content with a first obfuscated name entity to generate first obfuscated content; and
        serving the first obfuscated content to the first requesting user.

2. The system of claim 1, the operations further comprising:
    receiving a second request for the content from a second requesting user, the second requesting user having a second requesting user role;
    replacing the instance of the first name entity at the content with a second obfuscated name entity different than the first obfuscated name entity to generate second obfuscated content; and
    serving the second obfuscated content to the second requesting user.

3. The system of claim 1, the operations further comprising:
    extracting a plurality of name entities from the content, the plurality of name entities comprising the first name entity;
    assigning the first name entity to a first category, wherein the configuration data indicates that requesting users having the first requesting user role have a first level of access to name entities of the first category; and
    assigning a second name entity of the plurality of name entities to a second category, wherein the configuration data also indicates that the first requesting user has a second level of access to name entities of the second category.

4. The system of claim 1, the operations further comprising extracting a second name entity from the content, wherein the first obfuscated content includes the second name entity in an un-obfuscated form.

5. The system of claim 1, the operations further comprising:
    providing an indication of the first name entity to the submitting user; and
    receiving, from the submitting user, an association between the first requesting user role and the first name entity.

6. The system of claim 1, the operations further comprising:
    determining that the content comprises a first image;
    extracting a first face portion from the first image, the first face portion depicting a face; and
    receiving, from the submitting user, an association between the first face portion and a second requesting user role, wherein the configuration data indicates the association between the first face portion and the second requesting user role.

7. The system of claim 6, the operations further comprising providing, to the submitting user, an indication of the first face portion, wherein the association between the first face portion and the second requesting user role is received in response to the providing of the indication of the first face.

8. The system of claim 6, the operations further comprising:
    determining that the first requesting user does not have the second requesting user role, wherein the first obfuscated content is also generated at least in part by replacing the first face portion with a first obfuscated face portion.

9. The system of claim 1, the operations further comprising:
    determining that the content comprises a first image;
    extracting a plurality of face portions from the first image, the plurality of face portions comprising a first face portion depicting a first face and a second face portion depicting a second face;
    receiving, from the submitting user, an association between the first face portion and a second requesting user role, wherein the obfuscation data indicates the association between the first face portion and the second requesting user role; and
    receiving, from the submitting user, an association between the second face portion and a third requesting user role, wherein the obfuscation data indicates the association between the second face portion and the third requesting user role.

10. The system of claim 9, the operations further comprising:
determining that the first requesting user has the second requesting user role; and
determining that the first requesting user does not have the third requesting user role, wherein the first obfuscated content is also generated at least in part by replacing the second face portion with a second obfuscated face portion, and wherein the first obfuscated content includes the first face portion in an un-obfuscated form.

11. A method of serving shared content, the method comprising:
receiving content, by a content server and from a submitting user;
extracting, by the content server, a first name entity from the content, the first name entity comprising a string indicating a name;
generating, by the content server, configuration data for the content, the configuration data comprising an association between the first name entity and at least one requesting user role that is to receive the first name entity in obfuscated form;
receiving, by the content server, a first request for the content from a first requesting user, the first requesting user having a first requesting user role;
determining, by the content server and using the configuration data, that the first requesting user is to receive the first name entity in obfuscated form;
replacing, by the content server, an instance of the first name entity at the content with a first obfuscated name entity to generate first obfuscated content; and
serving, by the content server, the first obfuscated content to the requesting user by the content server.

12. The method of claim 11, further comprising:
receiving, by the content server, a second request for the content from a second requesting user, the second requesting user having a second requesting user role;
replacing, by the content server, the instance of the first name entity at the content with a second obfuscated name entity different than the first obfuscated name entity to generate second obfuscated content; and
serving, by the content server, the second obfuscated content to the second requesting user.

13. The method of claim 11, further comprising:
extracting a plurality of name entities from the content, the plurality of name entities comprising the first name entity;
assigning the first name entity to a first category, wherein the configuration data indicates that requesting users having the first requesting user role have a first level of access to name entities of the first category; and
assigning a second name entity of the plurality of name entities to a second category, wherein the configuration data also indicates that the first requesting user role has a second level of access to name entities of the second category.

14. The method of claim 11, further comprising extracting a second name entity from the content, wherein the first obfuscated content includes the second name entity in an un-obfuscated form.

15. The method of claim 11, further comprising:
providing, by the content server, an indication of the first name entity to the submitting user; and
receiving, from the submitting user, an association between the first requesting user role and the first name entity.

16. The method of claim 11, further comprising:
determining, by the content server, that the content comprises a first image;
extracting, by the content server, a first face portion from the first image, the first face portion depicting a face; and
receiving, from the submitting user, an association between the first face portion and a second requesting user role, wherein the configuration data indicates the association between the first face portion and the second requesting user role.

17. The method of claim 16, further comprising providing, by the content server and to the submitting user, an indication of the first face portion, wherein the association between the first face portion and the second requesting user role is received in response to the providing of the indication of the first face.

18. The method of claim 11, further comprising:
determining, by the content server, that the content comprises a first image;
extracting, by the content server, a plurality of face portions from the first image, the plurality of face portions comprising a first face portion depicting a first face and a second face portion depicting a second face;
receiving, from the submitting user, an association between the first face portion and a second requesting user role, wherein the obfuscation data indicates the association between the first face portion and the second requesting user role; and
receiving, from the submitting user, an association between the second face portion and a third requesting user role, wherein the obfuscation data indicates the association between the second face portion and the third requesting user role.

19. The method of claim 18, further comprising:
determining, by the content server, that the first requesting user has the second requesting user role; and
determining, by the content server, that the first requesting user does not have the third requesting user role, wherein the first obfuscated content is also generated at least in part by replacing the second face portion with a second obfuscated face portion, and wherein the first obfuscated content includes the first face portion in an un-obfuscated form.

20. A non-transitory machine-readable medium having instructions thereon that, when executed by at least one processor, cause the at least one processor to perform operations comprising:
receiving content from a submitting user;
extracting a first name entity from the content, the first name entity comprising a string indicating a name;
generating configuration data for the content, the configuration data comprising an association between the first name entity and at least one requesting user role that is to receive the first name entity in obfuscated form;
receiving a first request for the content from a first requesting user, the first requesting user having a first requesting user role;
determining and using the configuration data, that the first requesting user is to receive the first name entity in obfuscated form;

replacing an instance of the first name entity at the content with a first obfuscated name entity to generate first obfuscated content; and serving the first obfuscated content to the requesting user.

* * * * *